United States Patent [19]
Cha

[11] Patent Number: 5,600,372
[45] Date of Patent: Feb. 4, 1997

[54] FLANGE-BACK ADJUSTMENT METHOD FOR A VIDEO CAMERA

[75] Inventor: Doh H. Cha, Kyungki-do, Rep. of Korea

[73] Assignee: Goldstar Co., Ltd., Seoul, Rep. of Korea

[21] Appl. No.: 360,416

[22] Filed: Dec. 21, 1994

[30] Foreign Application Priority Data

Dec. 21, 1993 [KR] Rep. of Korea ................. 28833/1993

[51] Int. Cl.⁶ .................................................. H04N 5/232
[52] U.S. Cl. ........................................... 348/345; 348/347
[58] Field of Search ...................... 348/347, 358, 348/345; 354/400

[56] References Cited

U.S. PATENT DOCUMENTS

| | | | |
|---|---|---|---|
| 4,740,064 | 4/1988 | Kono et al. | 354/72 |
| 4,920,419 | 4/1990 | Easterly | 348/347 |
| 5,055,932 | 10/1991 | Hijakata | 348/347 |
| 5,352,882 | 10/1994 | Koyanaji et al. | 354/400 |
| 5,359,381 | 10/1994 | Miyazawa et al. | 354/400 |
| 5,424,776 | 6/1995 | Hirasawa | 348/347 |

FOREIGN PATENT DOCUMENTS 0564351 10/1993 European Pat. Off. .
4360378 12/1992 Japan .

OTHER PUBLICATIONS

Broadcast Technology, vol. 12, No. 7, May 1987, Canada., pp. 44, 46–47, Bentley Miller, "Of Lenses and Prisms: Optimizing Lens/Camera Performance".

Patent Abstracts of Japan vol. 15, No. 287 (P–1229) Apr. 23, 1991, corresponding to Japanese Laid Open Publication No. JP3098006.

*Primary Examiner*—Wendy R. Garber

[57] ABSTRACT

An improved flange-back adjustment method for a video camera capable of advantageously reducing the time needed for adjusting the flange-back and capable of correctly performing the flange-back adjustment is disclosed. The method includes determining a value of a first position on an actual trace curve, determining a value of a second position on the actual trace curve, calculating a difference between the first position value and the second position value, determining two corresponding points on a stored trace curve based on the calculated difference, and determining flange-back values based on these determinations.

16 Claims, 5 Drawing Sheets

FLANGE-BACK ADJUSTMENT METHOD FOR A VIDEO CAMERA

BACKGROUND OF THE INVENTION

1. Field of the Invention

The present invention relates to a flange-back adjustment method of a video camera, and particularly to an improved flange-back adjustment method of a video camera capable of advantageously reducing time needed for adjusting the flange-back and of correctly performing the flange-back adjustment.

2. Description of the Conventional Art

Referring to FIG. 1, there is shown a block diagram of a conventional video camera. As shown therein, the conventional video camera includes a lens section 10, a charge-coupled device (CCD) 20 for converting a light image from an object into electrical signals, a signal processing circuit 30 for processing the output signal of the CCD and for outputting a luminance signal Y and a chrominance signal C, a high pass filter 40 for filtering the luminance signal Y outputted from the video signal processing circuit 30, a signal detection circuit 50 for detecting the signal filtered via the high pass filter 40, a microcomputer 60 for outputting control signals in order to control zooming and focusing operations of the lens section 10 in accordance with the output signal of the signal detection circuit 50, and first and second motors M1 and M2 for providing the zooming and focusing operations of the lens section 10 with driving force in accordance with the control signals of the microcomputer 60.

Here, the lens section 10 includes a front lens 11, a movable variator lens 12 for performing the zooming operation, an iris 13 for passing a predetermined quantity of light, an intermediate lens 14, a movable focus lens is for performing the focussing operation, and first and second photo-interrupters 16 and 17 for respectively detecting the position of the variator lens 12 and the focus lens 15 and for transferring the detected position signal to the microcomputer 60.

The detailed operation of the conventional video camera will now be explained with reference to FIG. 1.

When light from an object is passed through the from lens 11 of the lens section 10, the variator lens 12 is moved for a proper zooming operation by the driving force generated from the first motor M1. Thereafter, the iris 13 controls the quantity of light passed from the variator lens 12. The light, the quantity of which is controlled therein, passes to the focus lens 15 through the intermediate lens 14. Here, the focus lens 15 is moved to a predetermined position so that the focussing of the object image is correctly performed as the variator lens 12 is moved.

The first and second photo-interrupters 16 and 17 detect the respective positions of the variator lens 12 and the focus lens 15 and transfer the signal corresponding to the detected position to the microcomputer 60.

The CCD 20 converts the light passed from the lens section 10 into electrical signals and then outputs the signals to the video signal processing circuit 30. The video signal processing circuit 30 processes the signals applied thereto and then outputs the chrominance signal C and the luminance signal Y. The high pass filter 40 receives the luminance signal Y outputted from the video signal processing circuit 30 and filters out the low band components of the luminance signal Y and then outputs the high band luminance signal to the signal detection circuit 50.

The signal detection circuit 50 detects the high band luminance signal and then outputs a result of such detection to the microcomputer 60. The microcomputer 60 judges the positions of the variator lens 12 and the focus lens 15 using the signals outputted from the first and second interrupters 16 and 17 and judges whether or not the focussing operation is correctly performed in accordance with the output signal of the signal detection circuit 50. Thereafter, the microcomputer 60 drives the first and second motors M1 and M2 to change the positions of the variator lens 12 and the focus lens 15, respectively.

However, the positions to which the focus lens 15 is moved in accordance with the changing positions of the variator lens 12 are determined at the time of designing the two lenses 12 and 15, and the data on the positions thereof is stored in the microcomputer 60 in the form of look-up tables.

Referring to FIG. 2, there are shown trace curves S1, S2, S3, and S4 which indicate every position of the focus lens 15 which is formed as the variator lens 12 is moved. As shown therein, as the variator lens 12 moves within a range from a wide-end limit to a tele-end limit, the focus lens 15 moves to predetermined positions in series along the trace curves S1, S2, S3 and S4, respectively.

In addition, if an object is not within a range of a predetermined distances(i.e., infinite, 10 m, 3 m, 1 m), the microcomputer 60 traces the trace curves S1, S2, S3, S4 and moves the focus lens 14 to a predetermined position.

However, the positions of the wide-angle end on each of the trace curves S1, S2, S3, S4 should be coincident with each other, but in actuality the positions thereof are not coincident with each other due to the manufacturing variance. Here, the variance is called "flange-back" which is usually used for compensating the trace curves S1, S2, S3, and S4, whereby the actual trace curve is obtained.

The conventional method of adjusting the flange-back will now be explained with reference to FIG. 3.

In the first step S1, the microcomputer 60 judges the position of the variator lens 12 in accordance with the signal from the first photo-interrupter 16 and drives the first motor M1 to move the variator lens 12 to a predetermined position of the wide-angle end.

In the second step S2, the image signal of the object imaged by the lens section 10 is processed in series by each of elements 20 to 50 and the result of such processes is inputted into the microcomputer 60. Thereafter, the microcomputer 60 judges whether or not a focussing operation is performed and drives the second motor M2 in order to move the focus lens 15 until the focussing operation is properly performed. After the focused condition is attained, the microcomputer 60 stores the position of the focus lens 15.

In the third step S3, the microcomputer 60 computes a position difference of the focus lens 15 along the trace curve between the wide-end and tele-end and moves the focus lens 15 by the computed position difference by driving the second motor M2.

In the fourth step S4, the microcomputer 60 moves the variator lens 12 to the tele-end on the trace curve by driving the first motor M1 and performs a focussing operation as in the second step S2 and then stores the position of the variator lens 12 as an updated tele-end position.

In the fifth step S5, the microcomputer 60 computes a position difference of the variator lens 12 between the wide-end and tele-end on the trace curve and moves the variator lens 12 towards the wide-end by the computed position difference by driving the first motor M1.

In the sixth step S6, the microcomputer 60 performs a focussing operation and stores the position of the focus lens 15.

In the seventh step S7, the microcomputer 60 compares the positions of the focus lens 15 which are stored in the second step S2 and the sixth step S6 and judges whether or not the position difference is within a predetermined range.

If the position difference is within the predetermined range, the position difference becomes a flange-back and then the flange-back operation is completed. Therefore, the focussing operation is performed using the trace curve which is updated by the flange-back.

In addition, if the position difference is not within the predetermined range, the steps S3 to S7 are repeatedly performed.

A conventional method of using a varying point on the trace curve in order to reduce the time required for adjusting the flange-back will now be explained with reference to FIG. 4.

In the first step S1', the microcomputer 60 recognizes the position of the variator lens 12 using the signals supplied from the first photo interrupter 16 and moves the variator lens 12 to a varying point on the trace curve by driving the first motor M1.

In the second step S2', the microcomputer 60 performs a focussing operation as in the second step S2 of FIG. 3 and stores the position of the focus lens 15.

In the third step S3', the microcomputer computes a position difference of the focus lens 15 on the trace curve between the varying point and the tele-end and moves the focus lens 15 by the computed position difference by driving the second motor M2.

In the fourth step S4', the microcomputer 60 moves the variator lens 12 to the tele-end by driving the first motor M1 and then performs a focussing operation as in the second step S2' and stores the position of the variator lens 12.

In the fifth step S5', the microcomputer 60 computes a position difference of the variator lens 12 between a varying point of the previously stored trace curve and the tele-end and moves the variator lens 12 towards the wide-end by the computed position difference by driving the first motor M1.

In the sixth step S6, the microcomputer 60 performs a focussing operation as in the second step S2' and stores the position of the focus lens 15.

In the seventh step S7, the microcomputer 60 compares the positions of the focus lens 15 which are stored in the steps S2' and S6'. If the difference between the stored positions is within a predetermined range, the eighth step S8' is performed.

In the eighth step S8', the microcomputer 60 computes a position difference of the focus lens 15 between a varying point on the previously stored trace curve and the wide-end thereof and moves the focus lens 15 by the computed position difference.

In the ninth step S9', the microcomputer 60 computes a position difference of the variator lens 12 between a varying point on the previously stored trace curve and the wide-end thereof and moves the variator lens 12 toward the wide-end by the computed position difference. Here, the moved position is set as the wide-end and then the adjustment of the flange-back is completed.

Meanwhile, if the position difference computed at the seventh step S7' is not within a predetermined range, the steps S3' to S7' are repeatedly performed.

The conventional flange-back adjustment method is performed by repeatedly moving the variator lens and the focus lens between the wide-end and the tele-end, so that it entails much time for adjusting the flange-back. In particular, in an attempt to reduce the adjusting time using the varying point on the trace curve, it is generally difficult to compute a more correct varying point since the inclination of the curve is relatively low. In addition, in the case that the lenses 12 and 15 cannot be moved between the wide-end and the tele-end, the flange-back adjustment cannot be performed.

SUMMARY OF THE INVENTION

It is an object of the present invention to provide an improved flange-back adjustment method for a video camera.

It is another object of the present invention to provide an improved flange-back adjustment method for a video camera capable of advantageously reducing the time needed for adjusting the flange-back and of correctly performing the flange-back adjustment.

To achieve the above objects, the flange-back adjustment method for a video camera according to the embodiments of the present invention includes a step which computes a first position on an actual trace curve; a step which computes a second position on the actual trace curve; a step which judges a distance between the first position and the second position on the stored trace curve; and a step which stores a flange-back value using the values judged in the third step.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DETAILED DESCRIPTION OF THE PREFERRED EMBODIMENTS

A flange-back adjustment method for a video camera according to the embodied present invention will now be explained with reference to FIGS. 5 and 6.

Figure 1:
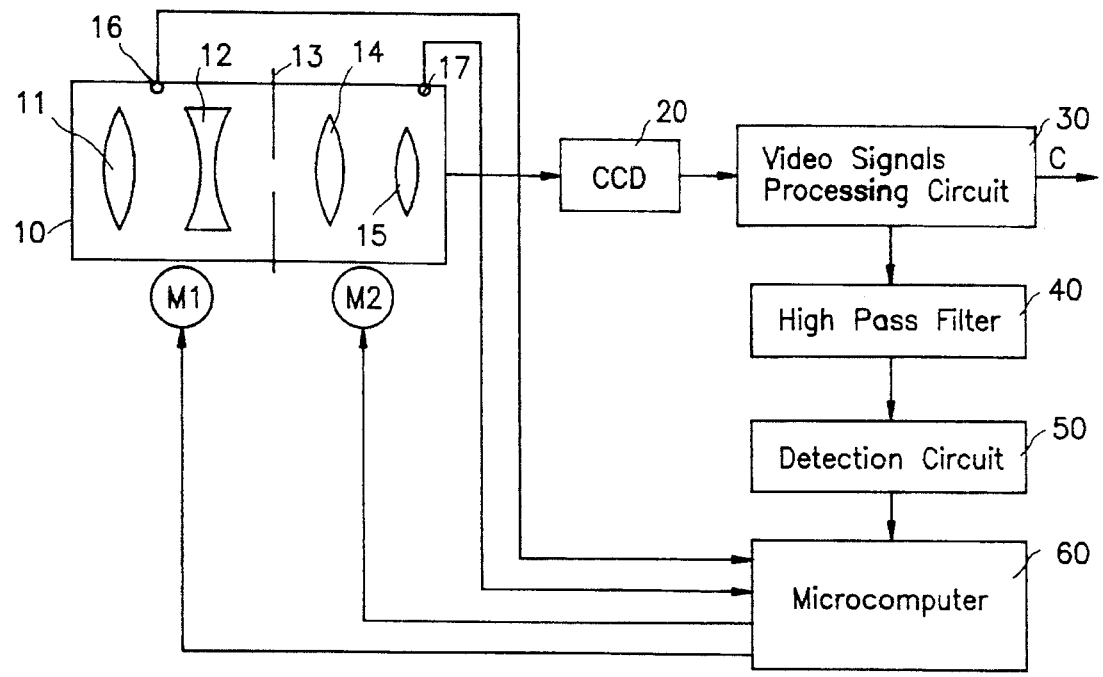
FIG. 1 is a block diagram showing a conventional video camera.
Figure 2:
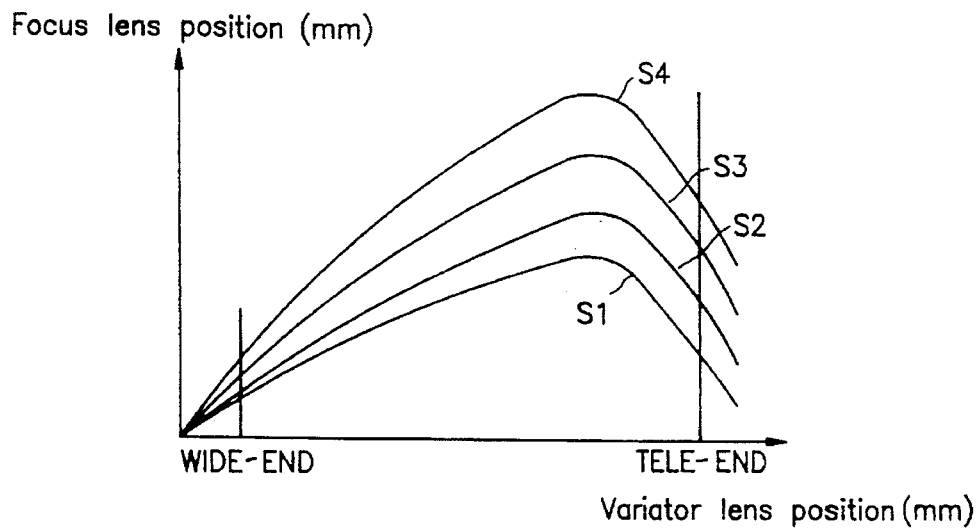
FIG. 2 is a graph showing trace curves of a focus lens position in accordance with a variator lens position.
Figure 3:
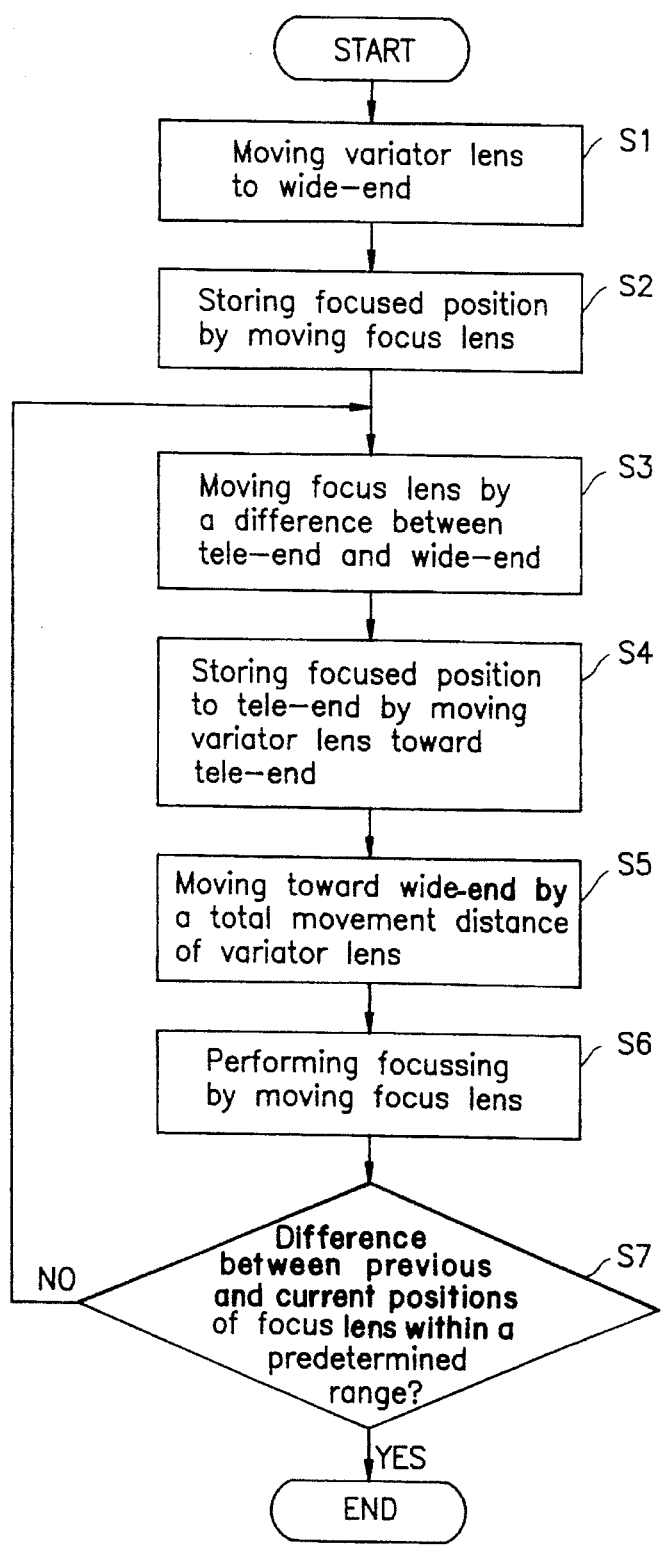
FIG. 3 is a flow chart showing a flange-back adjustment method of a conventional video camera.
Figure 4:
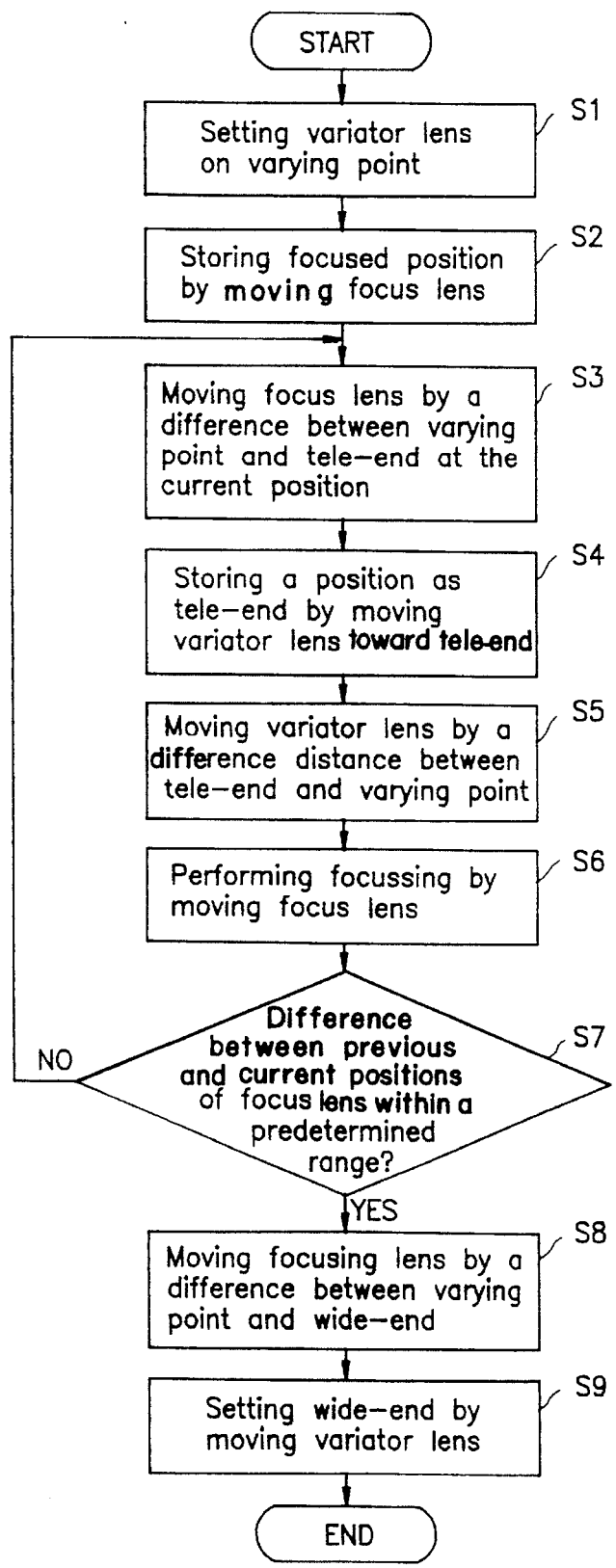
FIG. 4 is a flow chart showing a method of reducing time of the flange-back adjustment in a conventional video camera.
Figure 5:
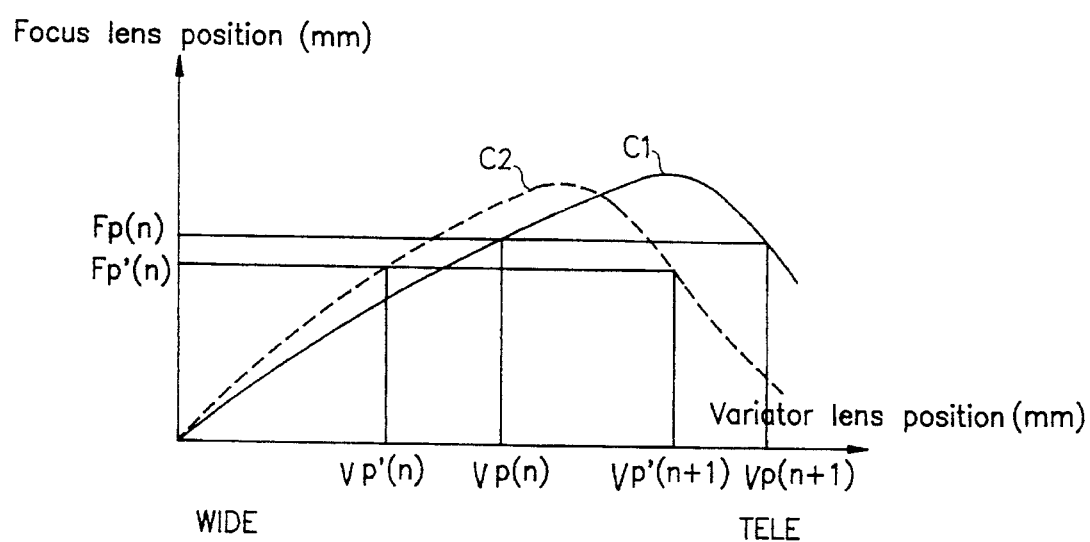
FIG. 5 is a graph showing trace curves utilized when designing and using a lens system according to the present invention.
Figure 6:
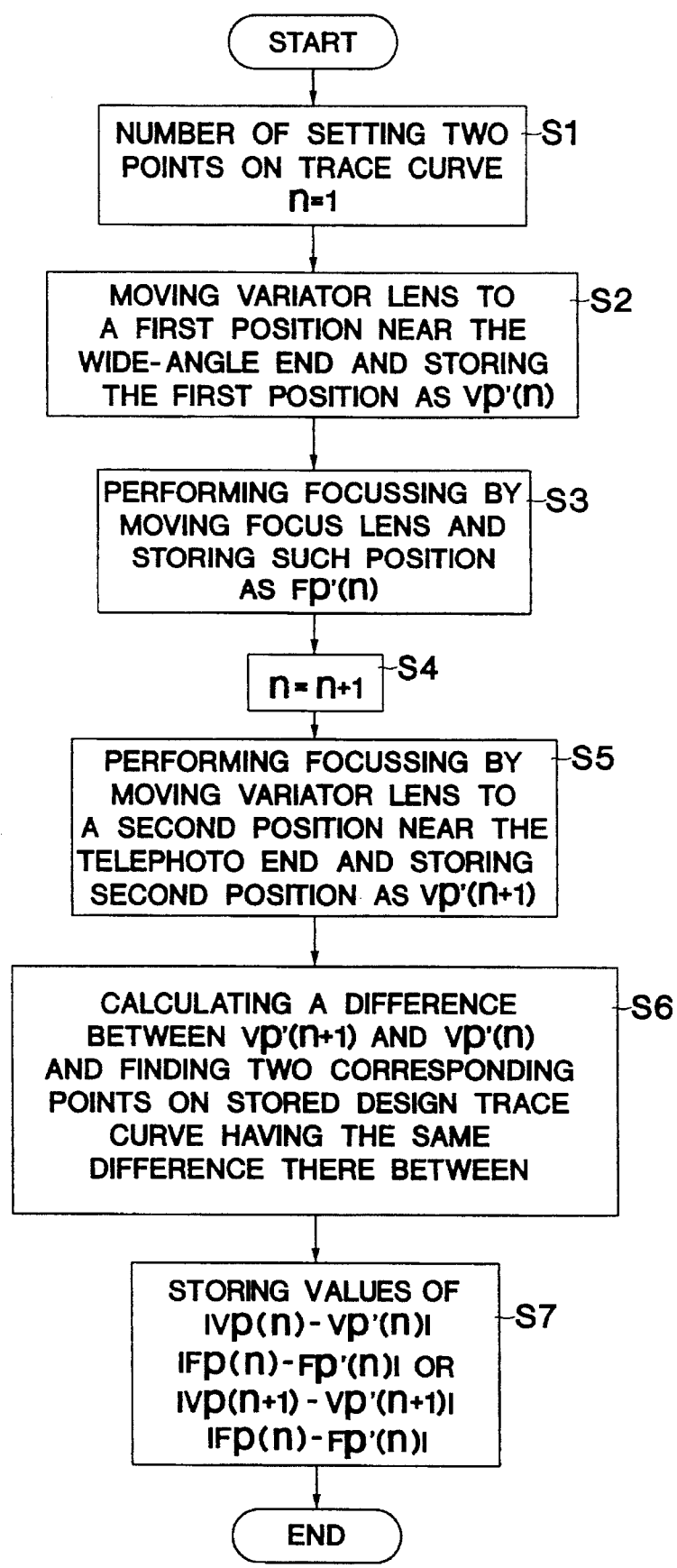
FIG. 6 is a flow chart showing an operation of adjusting a flange-back according to the embodiments of the present invention.

A first trace curve C1 which is previously determined at the time of designing a variator lens 12 and a focus lens 15, and a second trace curve C2 which is determined at the time when a pair of lenses 12 and 15 are used in the video camera are respectively shown in FIG. 5.

Here, the first trace curve C1 is previously stored, i.e, as a look-up table in a microcomputer 60.

The method of adjusting the flange-back using two predetermined points on the second trace curve C2 will now be explained with reference to FIG. 6.

In the first step S1, the variable 'n' for setting two points on the trace curve is initialized at 1.

In the second step S2, the microcomputer 60 moves the variator lens 12 to a first position VQ'(N) by driving the first motor M1.

In the third step S3, the microcomputer 60 performs a focussing operation to move the lens 15 to a position FP'(n).

In the fourth step S4, the microcomputer 60 increments the variable 'n' by 1.

In the fifth step S5, the microcomputer 60 moves the variator lens 12 toward the tele-end direction to a position of VP'(n+1) by driving the first motor M1 and performs the focussing operation as in the second step S2 and then stores the position VP'(n+1) of the variator lens 12.

In the sixth step S6, the microcomputer 60 computes a difference value |VP'(n+1)–VP'(n)| which is the difference between the detected position VP'(n+1) stored in the fifth step 5 and the detected position VP'(n) stored in the second step S2, and checks the first trace curve C1 to find two corresponding points thereon having a distance therebetween which is equal to the difference value of |VP'(n+1)–VP'(n)|. Such two points are labelled as VP(n+1) and VP(n) in FIG. 5.

In the seventh step S7, the microcomputer 60 computes and stores the values |VP(n)–VP'(n)|, |VP(n+1)–VP'(n+1)| and |FP(n)–FP'(n)|.

Here, the stored values represent a flange-back value which is used in correcting the first trace curve C1. The corrected curve is the second trace curve C2. Therefore, as the variator lens 12 moves, the positions of the focus lens 15 is traced along the second trace curve C2 and a focussing operation is performed thereby.

Meanwhile, if the variable 'n' of setting points is not 2, the steps S2 to S5 are repeatedly performed.

The flange-back adjustment method according to the embodied present invention computes a difference between two variator lens positions at which actual focusing is achieved and finds two corresponding points on the stored design trace curve having a distance therebetween which is equal to the computed difference, so that the time required to adjust the flange-back is advantageously reduced and the flange-back adjustment is correctly performed thereby.

What is claimed is:

1. A flange-back adjustment method for a video camera, comprising the steps of:

determining a value of a first position on an actual trace curve;

determining a value of a second position on the actual trace curve;

calculating a difference between the first position value and the second position value;

determining corresponding first and second positions on a predefined trace curve stored in memory using the calculated difference; and determining a flange-back value using the first and second positions on the actual trace curve and the first and second positions on the predefined trace curve.

2. The method of claim 1, wherein said step of determining a value of a first position includes the steps of:

moving a variator lens to the first position; and recording a current position of the variator lens as the value of the first position.

3. The method of claim 1, wherein said step of determining a value of a second position includes the steps of:

performing a focusing operation by moving a variator lens to a position after a varying point on the actual trace curve; and recording a focused current position of the variator lens as the value of the second position.

4. The method of claim 2, further comprising the steps of:

performing a focusing operation using a focus lens at the current position of the variator lens obtained at said moving step; and recording a focused current position of the focus lens.

5. The method of claim 4, wherein said step of determining a flange-back value includes the step of:

calculating a difference between a value of the focused current position of the focus lens and a value of a corresponding position of the focus lens on the predefined trace curve.

6. The method of claim 5, wherein said step of determining a flange-back value further includes the steps of:

calculating a difference between the first position value on the actual trace curve and a value of the first position on the predefined trace curve; and calculating a difference between the second position value on the actual trace curve and a value of the second position on the predefined trace curve.

7. The method of claim 1, wherein said step of determining a flange-back value includes the steps of:

calculating a difference between the first position value on the actual trace curve and a value of the first position on the predefined trace curve; and calculating a difference between the second position value on the actual trace curve and a value of the second position on the predefined trace curve.

8. A flange-back adjustment method for a video camera including a variator lens and a focus lens having design characteristics for video image focusing and a predefined trace curve stored in a memory corresponding to the design characteristics of the variator lens and the focus lens, the method comprising the steps of:

establishing a first position of the variator lens and the focus lens, and a second position of the variator lens and the focus lens, at which focusing of the variator lens and the focus lens is achieved;

determining a difference between the first established position and the second established position;

determining first and second corresponding positions on the predefined trace curve so that a difference between the first and second corresponding positions equals the difference between the first and second established positions;

determining a variator lens flange-back value and a focus lens flange-back value using the first and second established positions and the first and second corresponding positions; and focusing a desired video image using the flange-back values.

9. A method of claim 8, wherein said step of establishing includes the steps of:

setting a first focused position of the variator lens and the focus lens of the video camera when the variator lens is positioned toward a wide-angle viewing end thereof; and setting a second focused position of the variator lens and the focus lens of the video camera when the variator lens is positioned toward telephoto viewing end thereof.

10. A method of claim 8, wherein the variator lens flange-back value includes the absolute value of a difference between an actual first variator lens position and a designed first variator lens position and the focus lens flange-back value includes the absolute value of a difference between an actual focus lens position and a designed focus lens position.

11. A method of claim 8, wherein said step of determining a variator lens flange-back value includes the step of:

calculating an absolute value of a difference between the first established position of the variator lens and the first corresponding position of the variator lens.

12. A method of claim 11, wherein said step of determining a variator lens flange-back value further includes the step of:

calculating an absolute value of a difference between the second established position of the variator lens and the second corresponding position of the variator lens.

13. A method of claim 12, wherein said step of determining a focus lens flange-back value includes the step of:

calculating an absolute value of a difference between the first established position of the focus lens and the first corresponding position of the focus lens.

14. A method of claim 8, wherein said step of determining a focus lens flange-back value includes the step of:

calculating an absolute value of a difference between the first established position of the focus lens and the first corresponding position of the focus lens.

15. A method of claim 8, further comprising the step of:

compensating the stored predefined trace curve using the determined flange-back values for positioning the variator lens and the focus lens.

16. A method of claim 8, further comprising the step of:

storing the determined flange back values in the memory.

* * * * *